US010063516B2

(12) United States Patent
Schrecke et al.

(10) Patent No.: US 10,063,516 B2
(45) Date of Patent: Aug. 28, 2018

(54) IP ADDRESS TRANSLATION FOR TACTICAL NETWORKS

(71) Applicant: Raytheon Company, Waltham, MA (US)

(72) Inventors: Gregory S. Schrecke, Upton, MA (US); Steve Davidson, Acton, MA (US); Matt A. Kahn, Maynard, MA (US); Mu-Cheng Wang, Acton, MA (US); Mark W. Henry, Wellesley, MA (US)

(73) Assignee: Raytheon Company, Waltham, MA (US)

( * ) Notice: Subject to any disclaimer, the term of this patent is extended or adjusted under 35 U.S.C. 154(b) by 578 days.

(21) Appl. No.: 14/499,835

(22) Filed: Sep. 29, 2014

(65) Prior Publication Data
US 2016/0366095 A1    Dec. 15, 2016

(51) Int. Cl.
| H04L 29/12 | (2006.01) |
| H04L 29/08 | (2006.01) |
| H04L 29/06 | (2006.01) |
| H04L 12/741 | (2013.01) |

(52) U.S. Cl.
CPC .......... *H04L 61/2503* (2013.01); *H04L 45/74* (2013.01); *H04L 61/106* (2013.01); *H04L 65/4076* (2013.01); *H04L 67/12* (2013.01); *H04L 69/22* (2013.01)

(58) Field of Classification Search
CPC .... H04L 45/74; H04L 61/106; H04L 61/2503
See application file for complete search history.

(56) References Cited

U.S. PATENT DOCUMENTS

| 7,646,788 | B2 | 1/2010 | Dorris et al. | |
| 7,953,110 | B1 | 5/2011 | Dorris et al. | |
| 2006/0236365 | A1* | 10/2006 | Pham | H04L 63/105 726/1 |
| 2007/0071028 | A1* | 3/2007 | Dorris | H04L 12/4633 370/466 |
| 2010/0208691 | A1* | 8/2010 | Toyokawa | H04L 45/306 370/331 |

FOREIGN PATENT DOCUMENTS

| JP | 2003060664 A | 2/2003 |
| JP | 2009200791 A | 9/2009 |
| WO | WO-2014037779 A1 | 3/2014 |

OTHER PUBLICATIONS

"International Application Serial No. PCT/US2015/042443, International Search Report dated Oct. 27, 2015", 4 pgs.

(Continued)

*Primary Examiner* — Ranodhi Serrao
(74) *Attorney, Agent, or Firm* — Schwegman Lundberg & Woessner, P.A.

(57) ABSTRACT

A network gateway device, comprises a tactical data link interface circuit to receive a message from a tactical data link unit in a tactical data link network, the tactical data link unit associated with a unique identifier within the tactical data link network; a message transformation circuit to: extract the unique identifier from the message; and build an Internet Protocol packet using a source address based on the unique identifier; and an Internet Protocol interface circuit to process the Internet Protocol packet toward a destination.

15 Claims, 4 Drawing Sheets

(56) References Cited

OTHER PUBLICATIONS

"International Application Serial No. PCT/US2015/042443, Written Opinion dated Oct. 27, 2015", 6 pgs.
"JREAP—Wikipedia, the free encyclopedia", (Oct. 18, 2012), 1-2.
"Link 22—Wikipedia, the free encyclopedia", Anonymous, (Jul. 28, 2014), 1-19.
"The Progress of Tactical Radios from Legacy Systems to Cognitive Radios", IEEE Communications Magazine, IEEE Service Center, Piscataway, US, vol. 51, No. 10, (Oct. 1, 2013), 50-56.
George, Elmasry F, "Tactical Wireless Communications and Networks", 113-139.
"Korean Application Serial No. 10-2017-7011574, Notice of Preliminary Rejection dated Jan. 30, 2018", with English translation of claims, 11 pgs.
"Korean Application Serial No, 10-2017-7011574, Response filed Mar. 30, 2018 to Notice of Preliminary Rejection dated Jan. 30, 2018", W/English claims, 19 pgs.
"Japanese Application U.S. Appl. No. 2017-516923, Office Action dated May 8, 2018", w/ English translation, 6 pgs.

\* cited by examiner

IP ADDRESS TRANSLATION FOR TACTICAL NETWORKS

TECHNICAL FIELD

Embodiments pertain to routing network traffic and in particular, to Internet Protocol (IP) address translation for tactical networks.

BACKGROUND

A tactical data link (TDL) is a mechanism to disseminate information across some or all of a theatre of operations. A TDL can distribute information received by RADAR, SONAR, Information Friend or Foe (IFF), Electronic Warfare, Self-Reporting, and visual observation. Each TDL uses a data link standard in order to provide communications. Various Military Standards (MIL-STD) define the message formats used in TDLs. There are many types of TDLs including, but not limited to, Link 16, Link 22, Variable Message Format (VMF), and Link 11. Over time, different branches and operations of the military have adopted certain MIL-STDs. As an example, Link 16 is largely used by airborne military platforms, while VMF is largely used by maneuver and fire support units. There exists a need for bridging disparate TDLs for increased situational awareness, planning, deployment, and decision making in a theatre of operation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Tactical data links (TDL) generally employ unique network protocols to identify host stations within a network. Message transmission between TDLs is difficult due to a lack of common addressing. To integrate tactical networks with each other, some type of address translation is needed. This document describes a gateway device at the edge of a tactical network with one interface for the TDL traffic and another interface for a different TDL, or Internet Protocol (IP) traffic. In the case of ingress and egress TDLs, IP is only used for data handling internally. Ingress processing performed on an incoming data stream from the TDL extracts identifying information. The identifying information is the source address of the native (non-IP) address (e.g., the identifier of the sender and/or the destination). A TDL specification is used to determine the format and location of the identification information such that the ingress processing can extract the necessary information. The TDL interface on the gateway is associated with an IP subnet. Using the identifying information extracted from the TDL, the gateway device constructs an IP packet. The gateway device uses a combination of the identifying information and the subnet associated with the TDL interface to construct a source address for the IP header. The destination address can be constructed in a similar manner for data links that provide host identification information. For data links that are broadcast based, an IP broadcast or multicast address is used for the destination address. The IP packet data payload can be filled with the entire TDL message, the TDL data, or other portions extracted from the TDL message. Use of IP provides the facilities of IP routing, switching, and quality of service (QoS) techniques.

In this manner, each non-IP interface can connect to a gateway that has an effective IP subnet association. Identifying information is extracted from the tactical data and mapped to a host ID. Together this creates a unique IP address for the tactical data source. The tactical data is then encapsulated in an IP packet. This mechanism provides a way to use industry-standard IP routing and forwarding techniques to process one or more formats of non-IP tactical data. This is an enabling capability for the future of tactical network integration. Such a system does not use native TDL formats as intermediaries. This allows for information sharing between disparate data links, not just extension through or over other networks.

Figure 1:
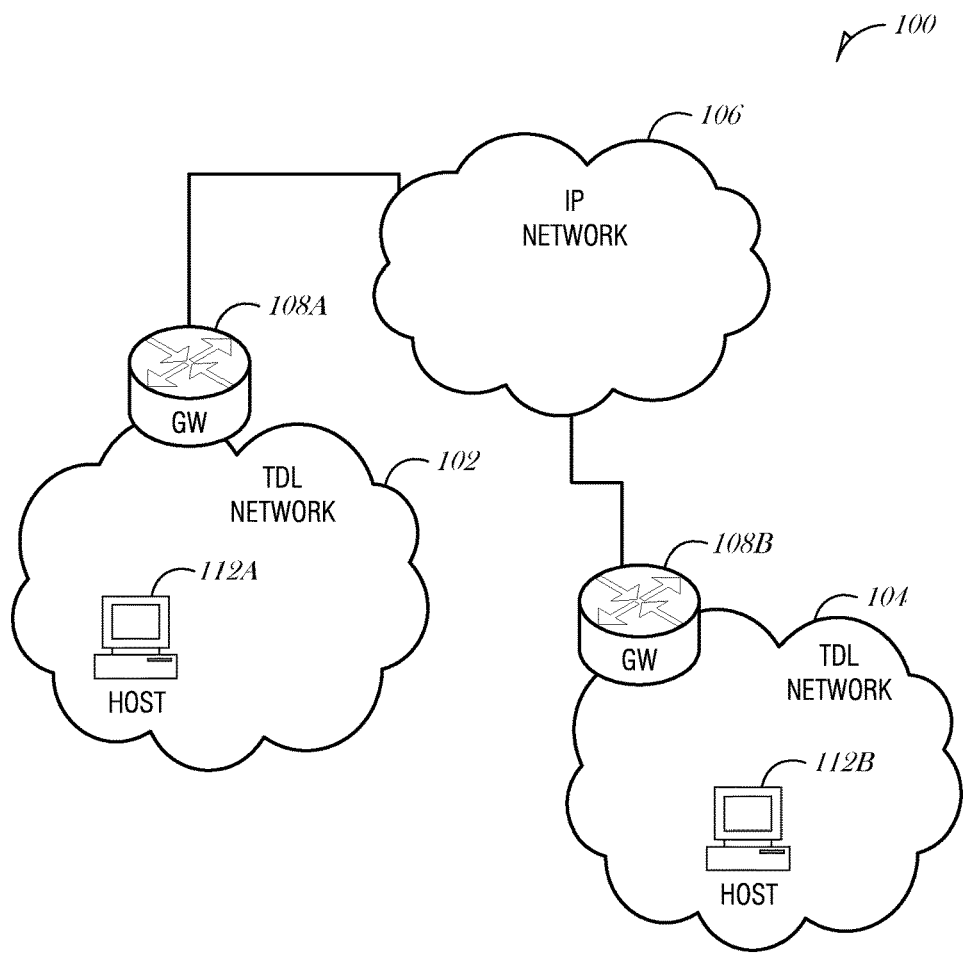
FIG. 1 is a diagram of a networked system, in accordance with an example embodiment.

FIG. 1 is a diagram of a networked system 100, in accordance with an example embodiment. A tactical data link (TDL) network 102 is communicatively connected to a second TDL 104 via a core IP network 106. The networked system 100 includes network devices, which may include a device at the edge of a particular network (e.g., a network edge). In the example illustrated, two gateway devices 108A, 108B of respective TDL networks 102, 104 are connected to the core IP network 106. In addition, hosts 112A, 112B can be directly or indirectly connected to the gateway devices 108A, 108B, respectively. The gateway devices 108A, 108B can be devices such as routers, gateways, or other network devices that analyze or direct network traffic. Other network configurations may be used without departing from the inventive subject matter described herein.

The TDL networks 102, 104 can be one of a variety of strategical networks including, but not limited to Link 16, Link 11, Link 22, Variable Message Format, Joint Range Extension Application Protocol (JREAP), and the like. Although not illustrated in FIG. 1, it is understood that multiple TDL networks can optionally be interfaced with a single gateway device so that the gateway device can receive communications from one of several TDL networks and prepare and transmit IP packets over an IP network to one or more TDLs. Additionally, the gateway device can use IP internally and provide addressing interoperability between two TDLs directly.

Figure 2:
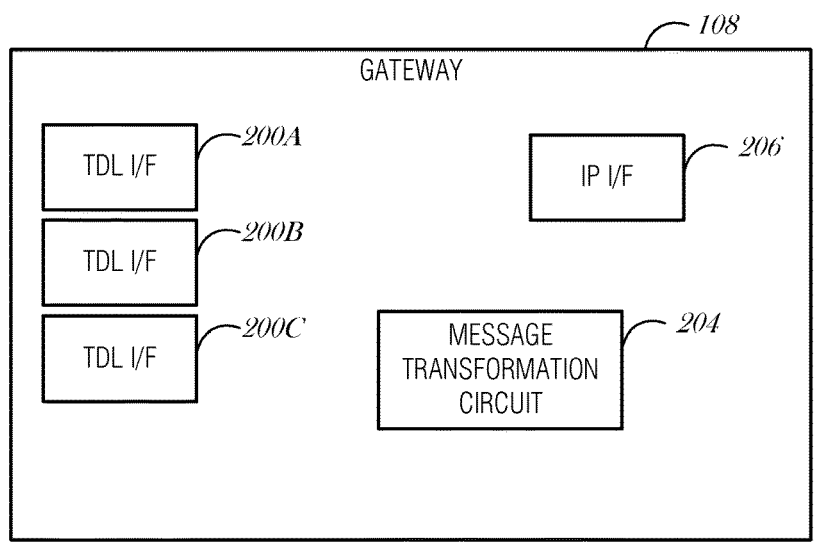
FIG. 2 is a schematic diagram of a gateway device, according to an embodiment.

FIG. 2 is a schematic diagram of a gateway device 108, according to an embodiment. The gateway device 108 includes three TDL interfaces 200A, 200B, 200C, each of which are connected to an appropriate TDL network. For example, TDL interface 200A can interface with a Link 16 TDL network, TDL interface 200B can interface with a Link 22 TDL network, and TDL interface 200C can interface with a VMF TDL network. The message transformation circuit 204 analyzes each message or bit stream received at a particular interface and creates an outgoing IP packet to transmit over the IP interface 206. Note that the IP interface may be internal to the gateway for TDL to TDL communication or external facing for TDL to IP interoperability.

The message transformation circuit 204 can detect the message type within a given TDL network. Each interface (200A, 200B, 200C) is configured for a known network type ahead of time. The interfaces may be referred to as "int0", "int1", and "int2". In the example, int0 200A can be configured for Link 16. Once that is known, the MIL Standard for the respective data link has a field that contains the message type. The message transformation circuit 204 is configured to analyze the field and determine the message format. Once the message type is determined, then a specific field or series of bits can be read from the message header to determine a unique identifier (e.g., a Source Track Number in a Link 16 message).

So, continuing with the example, the header of a message received on int0 200A indicates that the message is a J2 series message (e.g., Link 16). The MIL-STD-6016 is referenced to identify that the addressing information for that type of message is at a specific offset and is of a specified length. As another example, for VMF (e.g., int2 200C), the MIL-STD-2045-47001 specifies which message type follows. The specific messages have presence indicator bits that identify whether additional fields are included and if so, what their lengths are. Extracting data from VMF requires a bit more computation as a result. The actual messages for VMF are defined in MIL-STD-6017.

A message received on int0 200A in a J2 series message, the 15-bit Source Track Number field from the J-series message is used as the unique identifier and it is placed into the least-significant position in network portion of an IP address. In this case, a 17-bit subnet mask is used as the host ID. Variable length subnet masking (VLSM) is used to construct the 32 bit IPv4 address. Examples are provided in the following paragraphs.

For different TDLs such as Link 11, the addressing information is called PU and RU (Participating or Reporting Unit) within M-series messages and are 12 bits long. Link 11 has two flavors, Link11A is broadcast and Link11B is point-to-point. For Link 22, the addressing information can be the same as Link 16 using FJ-series messages, or can use its own F-series messages with addressing that is 19 bits long. When using FJ messages, the process for address translation is the same as for J series (accounting for 2 additional in the offsets bits) for Link 16. Link 22 F-series messages are defined in NATO STANANG 5522, which provides the offset and length of the identification field.

Link 22 was designed to be compatible with Link 16 and also to replace Link 11. As such is has specific ranges of addresses that are used when directly interoperating with those data links and can support 12, 15, and 19 bit addressing. The detected message type is used to determine the expected length and process accordingly—a 12 bit TDL identifier uses a 20 bit subnet; a 15 bit TDL identifier uses a 17 bit subnet; and a 19 bit TDL identifier uses a 13 bit subnet. It is understood that these subnet lengths are for IPv4 (Internet Protocol version 4) and that other subnet lengths may be used in other versions of the Internet Protocol (e.g., IPver. 6).

In an embodiment, the gateway device 108 is a network gateway device and comprises a tactical data link interface circuit (e.g., 200A) to receive a message from a tactical data link unit in a tactical data link network, the tactical data link unit associated with a unique identifier within the tactical data link network. The gateway device 108 also includes a message transformation circuit (e.g., 204) to extract the unique identifier from the message and build an Internet Protocol packet using a source address based on the unique identifier. The gateway device 108 also includes an Internet Protocol interface circuit (e.g., 206) to process the Internet Protocol packet toward a destination, which may be internal or external to the gateway device 108.

In an embodiment, to build the Internet Protocol packet, the message transformation circuit is configured to incorporate at least a portion of the bit representation of the unique identifier into a host portion of an Internet Protocol address as the source address. In a further embodiment, the tactical data link network is a Link 16 network, and to extract the unique identifier from the message, the message transformation circuit is configured to extract a 15-bit Source Track Number from a header portion of the message. In such an embodiment, building the Internet Protocol packet comprises using the seven most-significant bits of the Source Track Number as a portion of a third octet of an Internet Protocol address in the source address and using the eight least-significant bits of the Source Track Number as a fourth octet of the Internet Protocol address in the source address.

In an embodiment, the message transformation circuit is further configured to determine a message format of the message and based on the message format, extract a portion of the message representing at least a portion of the unique identifier. In a further embodiment, to determine the message format, the message transformation circuit is configured to identify the message format from a message header of the message. The message transformation circuit can be configured by a user such that a given interface is mapped to a given type of message and the message header format is then known by the message transformation circuit to allow the message transformation circuit to access the bits representing the identifier. In an embodiment, to build the Internet Protocol packet, the message transformation circuit is configured to use variable length subnet masking to construct the source address.

In an embodiment, the tactical data link network is a Link 16 network and the tactical data link unit is a participant in the Link 16 network. In a further embodiment, the message is formatted as a J-Series message format standard.

In an embodiment, the message transformation circuit is further configured to determine whether the message was sent as a broadcast message and set a destination address of an Internet Protocol header to an Internet Protocol broadcast or multicast address.

Figure 3:
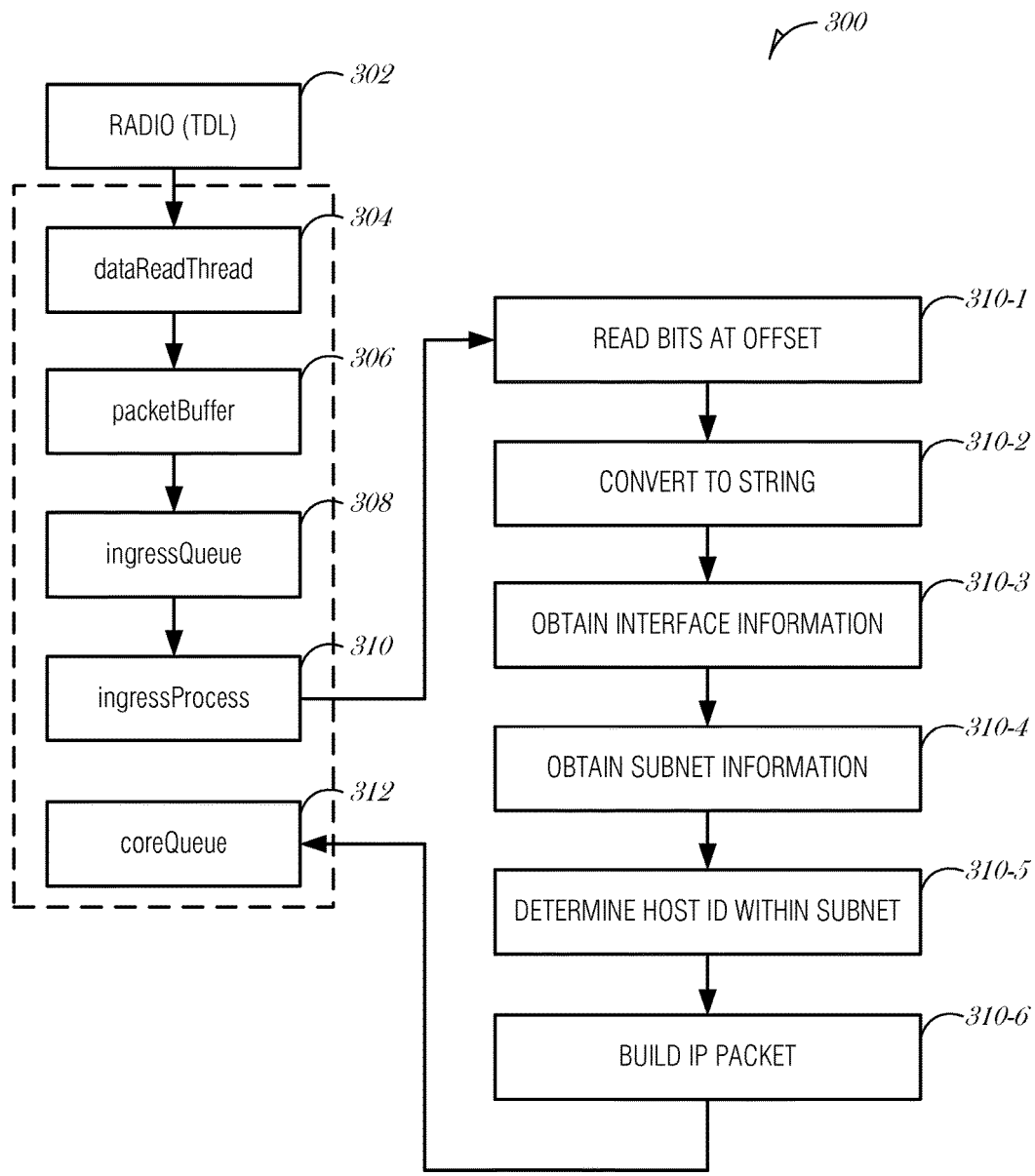
FIG. 3 is a control flow diagram illustrating processing of a data stream, according to an embodiment.

FIG. 3 is a control flow diagram illustrating processing of a data stream 300, according to an embodiment. A TDL radio 302 is used to receive a TDL data stream. The dataReadThread 304 receives the TDL data stream and processes it. Packets from the TDL data stream are temporarily stored in the packetBuffer 306 and queued for processing in the ingressQueue 308. An ingressProcess 310 processes a TDL message/packet from the ingressQueue 308 as is shown in the breakout flow.

At 310-1, a certain number of bits or bytes are read starting from an offset from data. This data represents the host identifier of the source. The offset is defined in configuration data and is based on military specifications for the various types of tactical data messages. The bits are converted to a string at 310-2. At 310-2, interface information is obtained. The interface information can be decoded from the data stream, for example by reading a message type from a header field. Alternatively, the interface information can be preconfigured for a certain interface (e.g., int0 is a Link 16 interface). At 310-4, subnet information is obtained. The subnet information is the effective subnet for the gateway for the particular interface. The subnet can be different lengths for different interfaces. At 310-5, an IP-based host ID is determined within the subnet based on the bits or bytes read out of the data (e.g., the host identifier). At 310-6, an IP packet is built using the IP-based host ID (e.g., 32-bit IPv4 address or a 128-bit IPv6 address). The IP packet can include the data from the bit stream in the data portion of the IP packet. This IP packet can then be queued in the coreQueue for transmission over an IP network (block 312).

Figure 4:
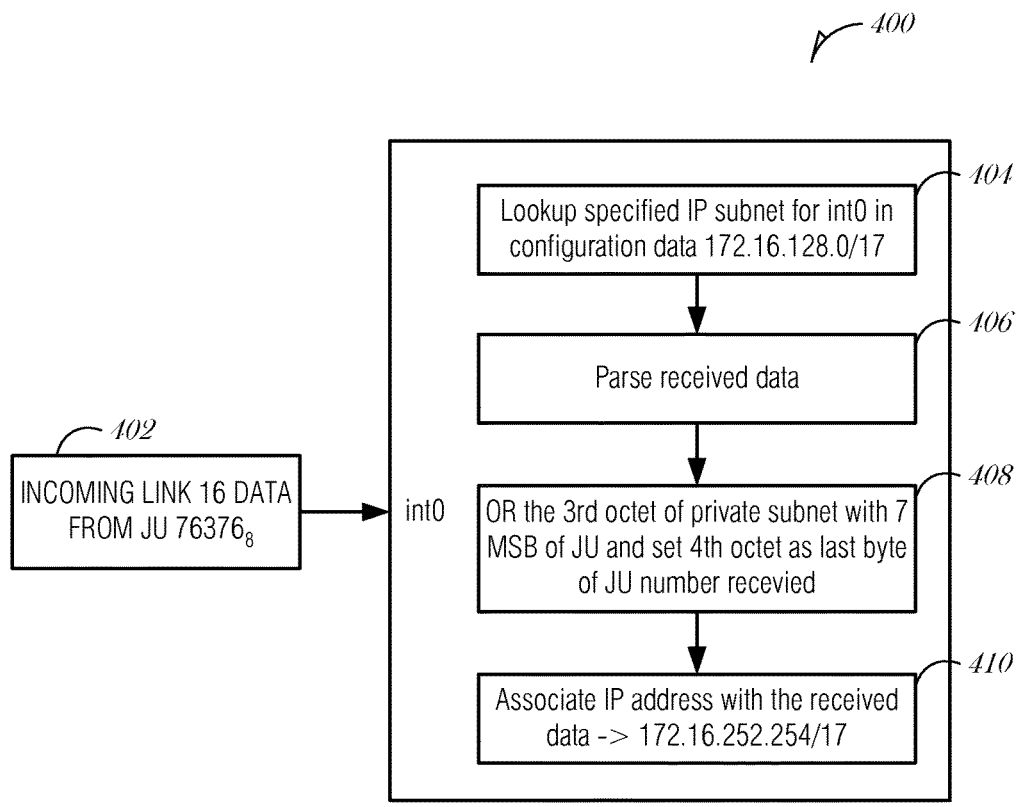
FIG. 4 is a block diagram illustrating control and data flow, according to an embodiment.

FIG. 4 is a block diagram illustrating control and data flow 400, according to an embodiment. Incoming Link 16 data from a JU (JTIDS (Joint Tactical Information Distribution System) unit) having an identification of 76376 in octal is received at 402 via interface zero (int0). This particular interface is associated with a Link 16 TDL network. At 404, a specified IP subnet for int0 is looked up in a configuration data. In the example shown, the IP address associated with this gateway and this interface is 172.16.128.0/17, which uses a 17-bit subnet mask. The received data is parsed at 406. The source JU identifier is stored across bits 5 to 19 of the Link 16 header word as $76376_8$. An AND bitwise operation is used to obtain specific bits that represent the source JU. At 408, an OR bitwise operation is used to apply the seven most-significant bits of the source JU identifier (1111100) with the third octet of the private subnet. This results in $11111100_2 = 252_{10}$. Additionally, at 408, the least-significant 8 bits (byte) is used as the fourth octet of the private subnet ($11111110_2 = 254_{10}$). At 410, the resultant IP address (172.16.252.254/17) is used as the source IP address in an IP packet constructed by the gateway.

Figure 5:
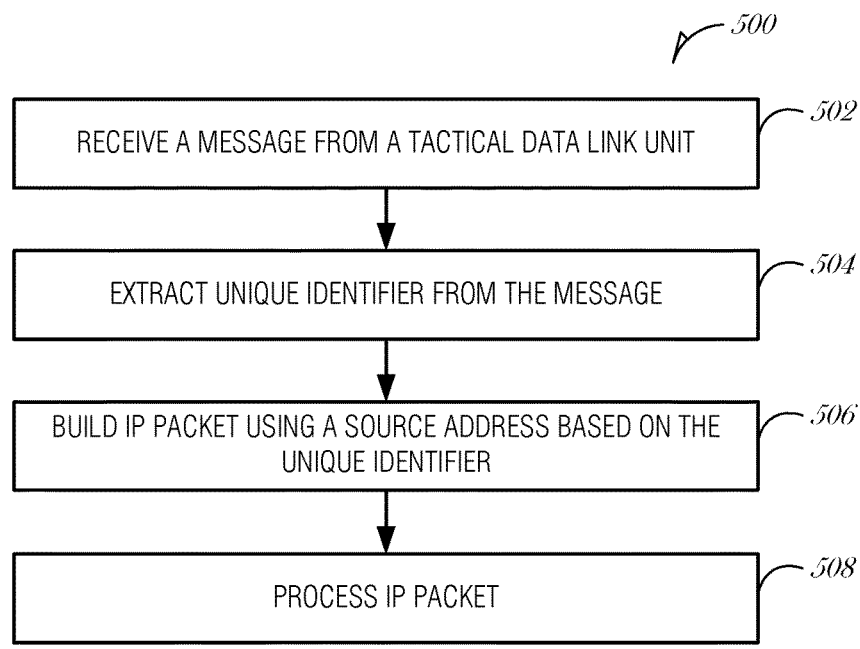
FIG. 5 is a flow diagram illustrating a process, according to an embodiment.

FIG. 5 is a flow diagram illustrating a process 500, according to an embodiment. At 502, a message from a tactical data link unit in a tactical data link network is received at a network gateway device, where the tactical data link unit associated with a unique identifier within the tactical data link network.

At 504, the unique identifier is extracted from the message.

At 506, an Internet Protocol packet is built using a source address based on the unique identifier. In an embodiment, building the Internet Protocol packet comprises incorporating at least a portion of a bit representation of the unique identifier into a host portion of a source Internet Protocol address.

At 508, the Internet Protocol packet is processed toward a destination.

In a further embodiment, the tactical data link network is a Link 16 network, and extracting the unique identifier from the message comprises extracting a 15-bit Source Track Number from a header portion of the message. In such an embodiment, building the Internet Protocol packet (e.g., IPv4 packet) comprises using the seven most-significant bits of the Source Track Number as a portion of a third octet of an Internet Protocol source address and using the eight least-significant bits of the Source Track Number as a fourth octet of the Internet Protocol source address. The 128-bit IPv6 address can be built similarly.

In a further embodiment, the process 500 includes determining a message format of the message and based on the message format, extracting a portion of the message representing at least a portion of the unique identifier. In an embodiment, determining the message format comprises identifying the message format from a message header of the message. In an embodiment, building the Internet Protocol packet comprises using variable length subnet masking to construct the source address.

In a further embodiment, the tactical data link network is a Link 16 network and the tactical data link unit is a participant in the Link 16 network. In an embodiment, the message is formatted as a J-Series message format standard.

In a further embodiment, the process 500 includes determining whether the message was sent as a broadcast message and setting a destination address of an Internet Protocol header to an Internet Protocol broadcast address. Multicast addressing works similarly.

Figure 6:
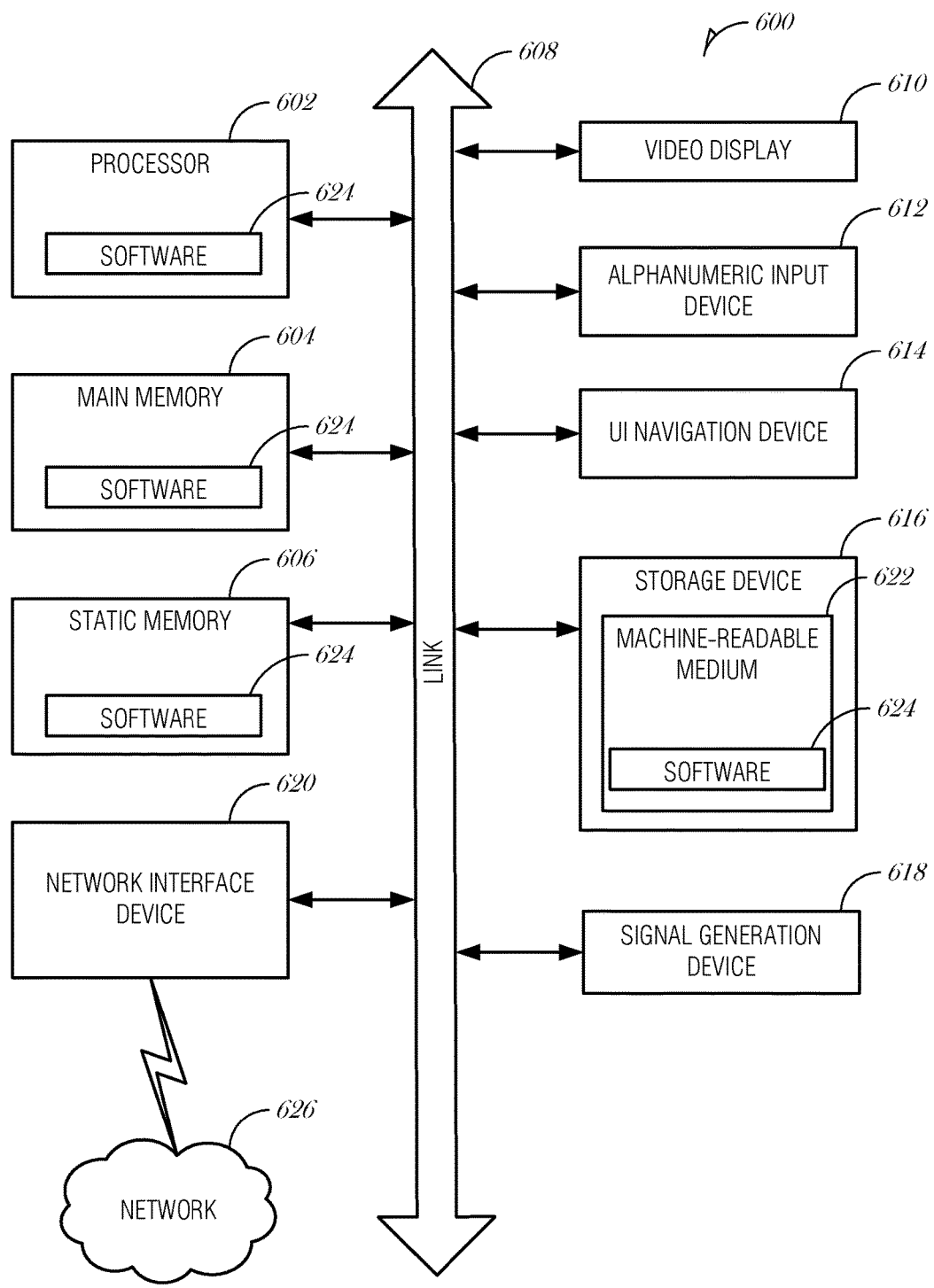
FIG. 6 is a block diagram illustrating an example machine upon which any one or more of the techniques (e.g., methodologies) discussed herein may perform, according to an embodiment.

FIG. 6 is a block diagram illustrating a machine in the example form of a computer system 600, within which a set or sequence of instructions may be executed to cause the machine to perform any one of the methodologies discussed herein, according to an embodiment. While only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further optionally include a video display unit 610, an alphanumeric input device 612 (e.g., a keyboard), or a user interface (UI) navigation device 614 (e.g., a mouse). In an embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, wireless data networks (e.g., Wi-Fi, 3G, and 4G LTE/LTE-A or WiMAX networks), and tactical data link networks. The term "transmission medium" shall be taken to include any intangible medium that is capable of storing, encoding, or carrying instructions for execution by the machine, and includes digital or analog communications signals or other intangible medium to facilitate communication of such software.

The description and the drawings herein sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

What have been described above are new systems and methods for routing network traffic between tactical data links. Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:
   receiving by a network gateway device, a message from a tactical data link unit in a tactical data link network, the tactical data link unit associated with a unique identifier within the tactical data link network and lacking a preassigned Internet Protocol address;
   identifying, by the network gateway device, a message format from a message header of the message;
   based on the message format, extracting, by the network gateway device, a portion of the message representing at least a portion of the unique identifier;
   building, by the network gateway device, an Internet Protocol packet that includes a source address field in a header portion, and generating a value of the source address field that is based on a combination of the unique identifier and an identifier of the tactical data link network; and
   sending, by the network gateway device, the Internet Protocol packet toward a destination over an Internet-Protocol network, wherein the message from the tactical data link is incompatible with the Internet-Protocol network.

2. The method of claim 1, wherein building the Internet Protocol packet comprises incorporating at least a portion of a bit representation of the unique identifier into a host portion of a source Internet Protocol address.

3. The method of claim 1, wherein the tactical data link network is a Link 16 network, and wherein extracting the unique identifier from the message comprises:
   extracting a 15-bit Source Track Number from a header portion of the message, and wherein building the Internet Protocol packet comprises:
   using the seven most-significant bits of the Source Track Number as a portion of a third octet of an Internet Protocol source address; and
   using the eight least-significant bits of the Source Track Number as a fourth octet of the Internet Protocol source address.

4. The method of claim 1, wherein building the Internet Protocol packet comprises: using variable length subnet masking to construct the source address.

5. The method of claim 1, wherein the tactical data link network is a Link 16 network and the tactical data link unit is a participant in the Link 16 network.

6. The method of claim 5, wherein the message is formatted as a J-Series message format standard.

7. The method of claim 1, further comprising:
   determining whether the message was sent as a broadcast message; and
   setting a destination address of an Internet Protocol header to an Internet Protocol broadcast address.

8. A network gateway device, comprising:
   a tactical data link interface circuit to receive a message from a tactical data link unit in a tactical data link network, the tactical data link unit associated with a unique identifier within the tactical data link network and lacking a preassigned Internet Protocol address;
   a message transformation circuit to:
   identify a message format from a message header of the message;
   based on the message format, extract a portion of the message representing at least a portion of the unique identifier;

build an Internet Protocol packet that includes a source address field in a header portion, and generating a value of the source address field that is based on a combination of the unique identifier and an identifier of the tactical data link network; and an Internet Protocol interface circuit to send the Internet Protocol packet toward a destination over an Internet-Protocol network, wherein the message from the tactical data link is incompatible with the Internet-Protocol network.

9. The system of claim 8, wherein to build the Internet Protocol packet, the message transformation circuit is configured to incorporate at least a portion of the bit representation of the unique identifier into a host portion of an Internet Protocol address as the source address.

10. The system of claim 8, wherein the tactical data link network is a Link 16 network, and wherein to extract the unique identifier from the message, the message transformation circuit is configured to:
  extract a 15-bit Source Track Number from a header portion of the message, and
  wherein to build the Internet Protocol packet, the message transformation circuit is configured to:
  use the seven most-significant bits of the Source Track Number as a portion of a third octet of an Internet Protocol address in the source address; and
  use the eight least-significant bits of the Source Track Number as a fourth octet of the Internet Protocol address in the source address.

11. The system of claim 8, wherein to build the Internet Protocol packet, the message transformation circuit is configured to: use variable length subnet masking to construct the source address.

12. The system of claim 8, wherein the tactical data link network is a Link 16 network and the tactical data link unit is a participant in the Link 16 network.

13. The system of claim 12, wherein the message is formatted as a J-Series message format standard.

14. The system of claim 8, wherein the message transformation circuit is further configured to:
  determine whether the message was sent as a broadcast message; and
  set a destination address of an Internet Protocol header to an Internet Protocol broadcast address.

15. A non-transitory computer-readable medium including instructions, which when executed by a computer, cause the computer to perform the operations comprising:
  receiving, at a network gateway device, a message from a tactical data link unit in a tactical data link network, the tactical data link unit associated with a unique identifier within the tactical data link network and lacking a preassigned Internet Protocol address;
  identifying a message format from a message header of the message;
  based on the message format, extracting a portion of the message representing at least a portion of the unique identifier;
  building an Internet Protocol packet that includes a source address field in a header portion, and generating a value of the source address field that is based on a combination of the unique identifier and an identifier of the tactical data link network; and
  sending the Internet Protocol packet toward a destination over an Internet-Protocol network, wherein the message from the tactical data link is incompatible with the Internet-Protocol network.

* * * * *